US 6,237,299 B1

(12) United States Patent
Gortan

(10) Patent No.: US 6,237,299 B1
(45) Date of Patent: May 29, 2001

(54) LATTICE GIRDER, IN PARTICULAR FOR FORMING A LOAD-BEARING GUARDRAIL ON A SUSPENDED WALKWAY

(75) Inventor: Guido Gortan, Luxembourg (DE)

(73) Assignee: Societe d'Etude et de Construction d'Appareils de Levage et de Traction (FR)

( * ) Notice: Subject to any disclaimer, the term of this patent is extended or adjusted under 35 U.S.C. 154(b) by 0 days.

(21) Appl. No.: 08/913,271
(22) PCT Filed: Feb. 29, 1996
(86) PCT No.: PCT/IB96/00152
 § 371 Date: Mar. 22, 1999
 § 102(e) Date: Mar. 22, 1999
(87) PCT Pub. No.: WO96/27060
 PCT Pub. Date: Sep. 6, 1996

(30) Foreign Application Priority Data

Mar. 2, 1995 (FR) .................................................. 95 02406

(51) Int. Cl.⁷ ...................................................... E04C 3/02
(52) U.S. Cl. ................................ 52/693; 52/667; 52/668; 52/690; 52/650.3; 403/263; 403/252; 256/65; 256/23
(58) Field of Search ............................. 52/693, 695, 690, 52/667, 668, 650.3; 403/263, 252, 230, 247; 256/21, 65, 23, 24

(56) References Cited

U.S. PATENT DOCUMENTS

| 1,376,150 | * | 4/1921 | Miller | 403/230 |
| 1,453,114 | * | 4/1923 | Rapp et al. | 244/123 |
| 2,514,607 | * | 7/1950 | McLean | 52/692 |
| 2,668,606 | * | 2/1954 | King | 52/693 |
| 2,860,743 | * | 11/1958 | Cliff | 52/692 |
| 3,155,202 | * | 11/1964 | Milette | 52/663 |
| 3,686,819 | * | 8/1972 | Atkinson | 52/693 |
| 3,927,950 | * | 12/1975 | Herrmann et al. | 403/346 |
| 4,027,855 | * | 6/1977 | Lauzier | 256/21 |
| 4,102,108 | * | 7/1978 | Cody | 52/693 |
| 4,485,597 | * | 12/1984 | Worrallo | 52/479 |
| 4,532,749 | * | 8/1985 | Perk | 52/668 |
| 4,586,310 | * | 5/1986 | Baril et al. | 52/665 |
| 4,761,930 | * | 8/1988 | Tepera | 52/669 |
| 5,417,028 | * | 5/1995 | Meyer | 52/737.6 |
| 5,437,136 | * | 8/1995 | Triebel | 52/693 |
| 5,606,837 | * | 3/1997 | Holizlander | 52/693 |
| 5,644,888 | * | 7/1997 | Johnson | 52/651.01 |
| 5,867,963 | * | 2/1999 | Hershey | 52/729.4 |
| 5,899,042 | * | 5/1999 | Pellock | 52/696 |

* cited by examiner

Primary Examiner—Christopher T. Kent
Assistant Examiner—Jennifer I. Thissell
(74) Attorney, Agent, or Firm—William A. Drucker

(57) ABSTRACT

A lattice girder generally including a top rail, a bottom rail, vertical end posts and slanted crossbeams, wherein all of the members consist of uniform hollow sections that may be fitted into one another and thereby rigidly interconnected. The girder rail consists of two half-sections (18,19) internally provided with longitudinal flanges (20, 21) having transverse serrations so that the two half-sections may be permanently secured to one another by pressing them together with the serrations in mutual engagement. The end of a slanted crossbeam (24) having notches (at 25 and 26) is inserted into openings (22,23) in the half-sections to lock and engage the rail. Weldless lattice girders may thus be produced, in particular for forming a walkway guardrail.

5 Claims, 3 Drawing Sheets

LATTICE GIRDER, IN PARTICULAR FOR FORMING A LOAD-BEARING GUARDRAIL ON A SUSPENDED WALKWAY

The invention concerns lattice girders constituted by elements rigidly interconnected so as to embody structures able to carry loads.

In known lattice girders, their constitutive elements are disposed according to the orientation of the loads to be supported and their distribution. These elements are generally interconnected by means of welding.

One of the applications of these structures is for forming walkway load-bearing guard-rails and in particular a suspended walkway so as to connect the load of a floor to linking or carrying straps.

The present invention concerns embodying these lattice girder structures to in particular form walkway guard-rails with the aid of weldless assemblies.

This solution is advantageous in that it is able to reduce production costs and eliminate the stresses inherent in the welding technique. In fact, the structures concerned are preferably made of aluminium, given the fact that the weight gain obtained by the use of this material.

Now, especially as regards aluminium, the welding technique has harmful and costly consequences. The welding operation results on the zone in question in a partially neutralising annealing effect, but more particularly the elastic limit improvement obtained via the heat treatment of the quality of aluminium used for this purpose.

The lowering of the resultant elastic limit requires that the size of the components used be increased, thus increasing costs.

In addition, any weld increases the risks of corrosion and, so as to limit these risks, requires that a costly strict quality control procedure be set up, the cost of this being added to the cost of employing a qualified technician.

The document EP-A- 0 577 096 concerns a lattice girder made up of hollow beams assembled with solid crossbeams having an I-shaped profile. Each beam comprises a longitudinal aperture with a width corresponding to the central core of the crossbeam and in which the oblique crossbeam is able to slide without being locked at a particular point of the beam. The embodiment of a lattice girder according to this document has the drawback of then requiring that the number of crossbeams, their inclination and the length of the beams being such that each crossbeam stops against the adjacent crossbeams, the extremities of the end crossbeams being positioned at the extremities of the beams. In addition, it is essential that a device (not described elsewhere in this document) locks the unit at these extremities.

The lattice girder structure of the invention is made up of an assembly of interconnected elements via the embedding of projecting portions of some of the latter in portions forming housings receiving the latter and wherein its structural elements are solely constituted by hollow homogeneous profiles having cuts for embodying links via embedding by which the embedded portions laterally self-lock with the portions receiving them.

The assemblies of the invention are therefore embodied so as to satisfy the load stresses applied to them forcibly in a particular direction whilst ensuring the rigid linking of the components.

These assemblies can be completed by members, such as rivets or other elements, so as to keep them in their definitive position, although for the most complete embodiment of the invention, these additional members are not essential.

The assemblies of the invention are configured so as to vary according to the assembling angles, a right angle assembly being merely one case of application.

According to one particularly advantageous embodiment of the assembling technique of the invention, the elements receiving the portions embedded from the other elements are formed of two half-elements with one applied longitudinally against the other and rendered integral by an appropriate linking device so that the embedded portions can be introduced prior to assembling of the two half-elements in the corresponding openings of the latter, and, after said half-elements have been assembled, are locked there longitudinally by cuts made on two parallel sides of the embedded portions according to an angle with the axis of each embedded element corresponding to the assembly axis of the latter with the receiving element, the section of the embedded portion for this purpose being suitably dimensioned.

The linking member rendering integral the two half-elements of each beam is embodied by a hooking structure integrated with each beam half-element, the two hooking structures being opposite each other with one corresponding to the other so as to render the two half-elements integral by one pressing against the other.

The girder embodied according to the invention by the above-mentioned assemblies can be fitted with vertical extremity jambs making it possible to secure it to a walkway floor module so as to form a walkway or walkway module.

To this end, a type of assembly can be embodied in which the horizontal beams of the girder each receive at their extremities a notched extension for receiving via vertical engagement at least one partially open stanchion whose lower portion, after being placed, is fixed to a structural floor element so as to embody a walkway or walkway module.

So as to clearly understand the invention, there now follows a description of examples of preferred embodiments with reference to the accompanying drawing on which:

Figure 1:
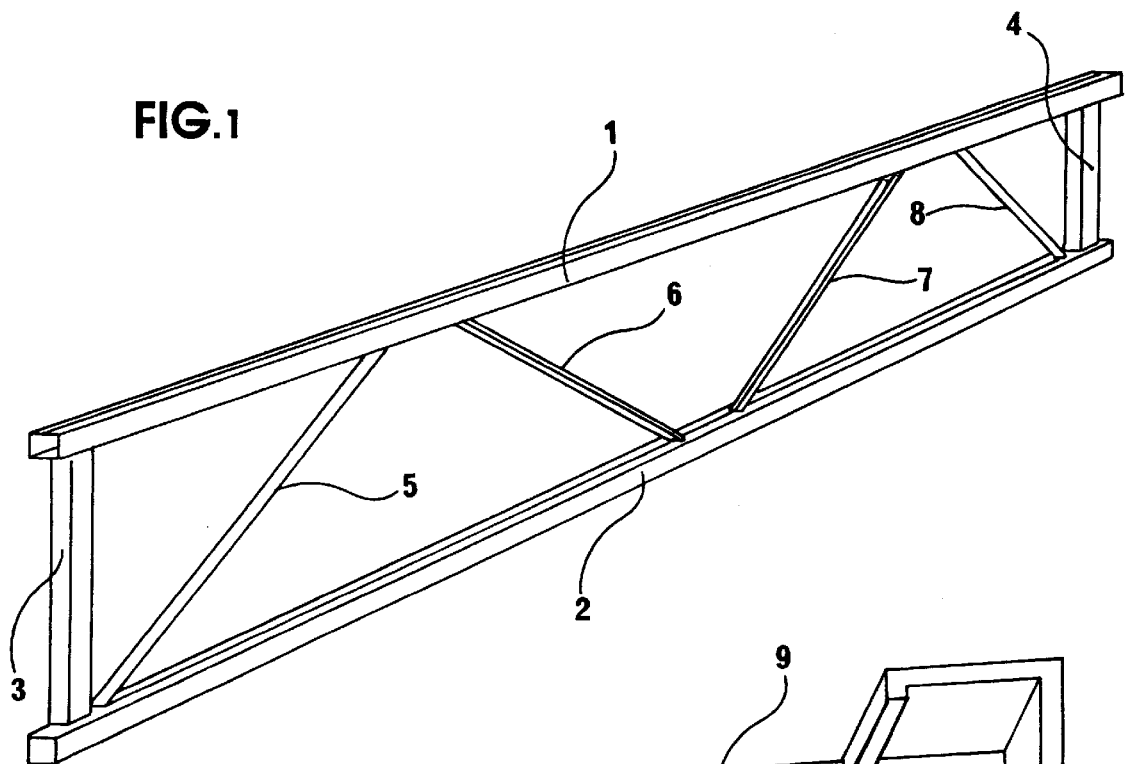
FIG. 1 shows an example of a lattice girder according to the invention.
Figure 4:
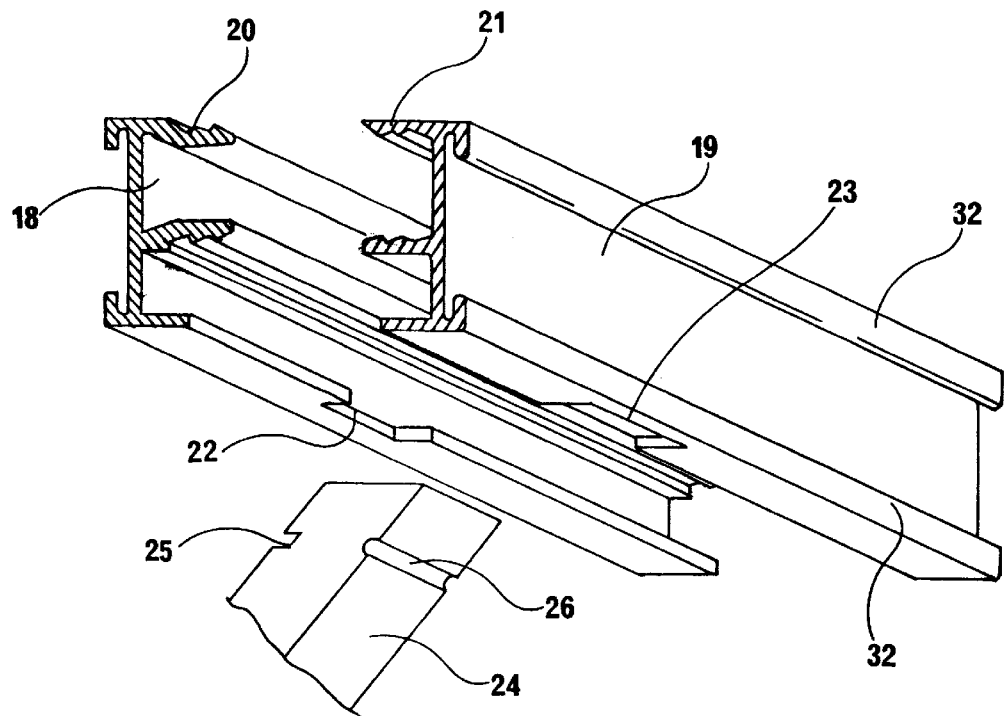
Figure 5:
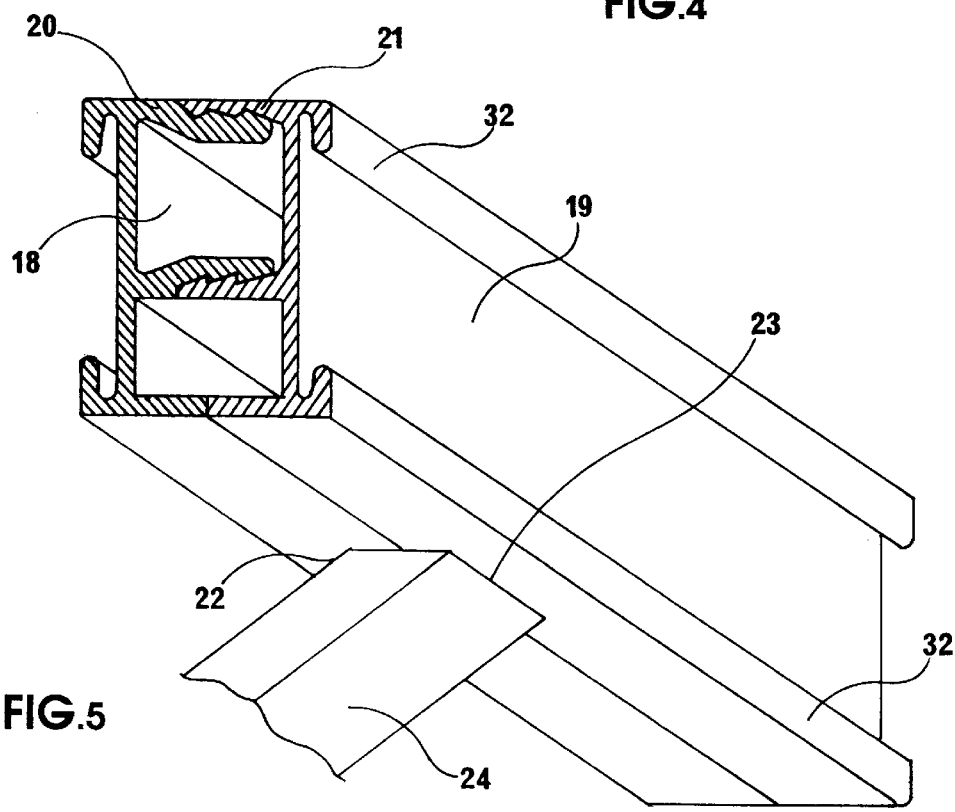
Figure 6:
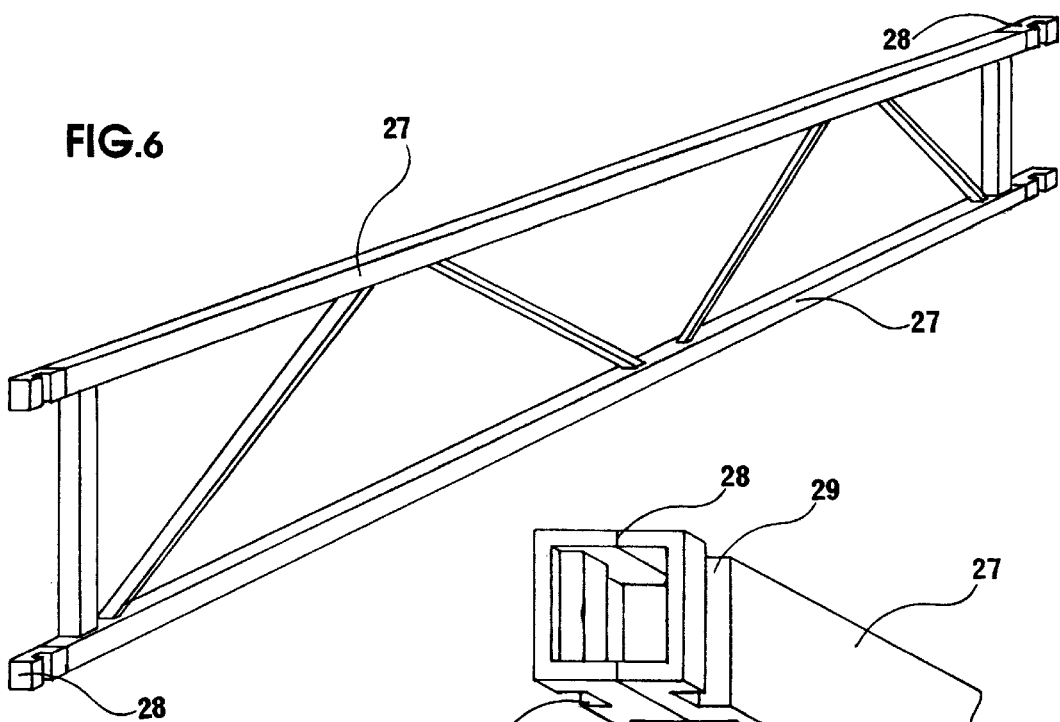
Figure 7:
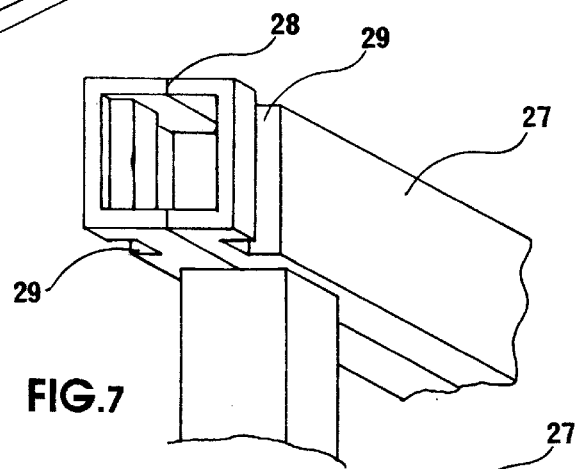

FIGS. 4 and 5 respectively show prior and after assembling the self-locking linking mode of the invention of a beam made up of two half-elements and an oblique crossbeam;

FIG. 6 shows a variant of the lattice girder of FIG. 1 and comprising at its extremities assembly grooves with guard-rail stanchions;

FIG. 7 is a detailed view of an extremity of the girder of FIG. 6, and

Figure 8:
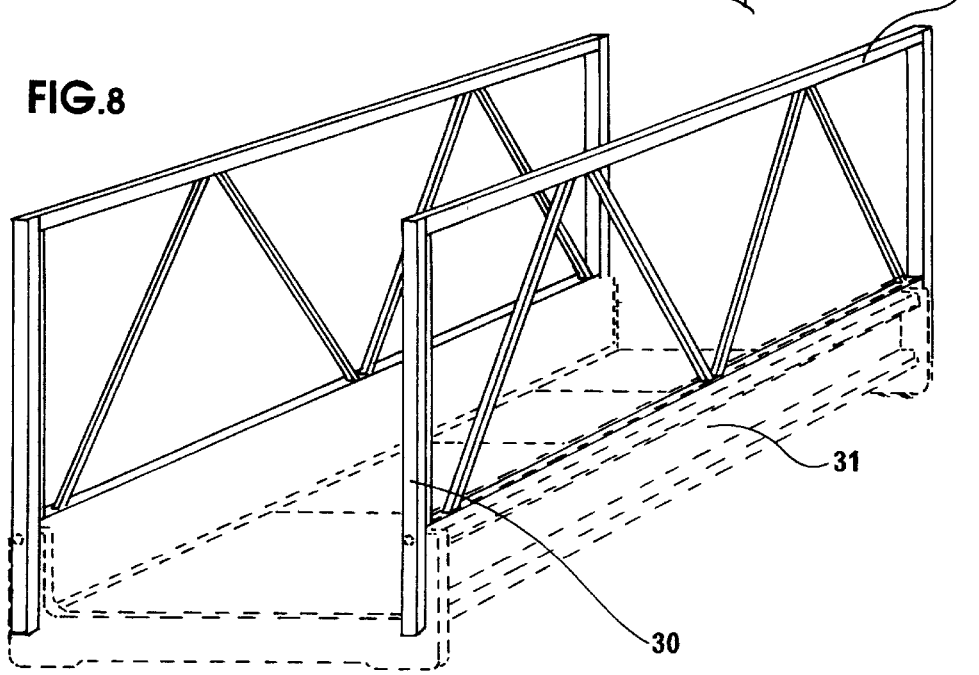

FIG. 8 shows the final assembly of the girder of FIGS. 6 and 7 so as to constitute the guard-rail of a suspended walkway.

With reference to FIG. 1, the latter shows a simple assembly of a lattice girder formed inside a plane and embodied according to the invention. This girder includes upper 1 and lower 2 beams, vertical extremity stanchions 3, 4 and oblique crossbeams 5,6,7 and 8, all these elements being constituted by hollow homogeneous profiles whose assembling is effected rigidly by means of embedding without the need for other bearing linking means, such as weld seams.

Figure 2:
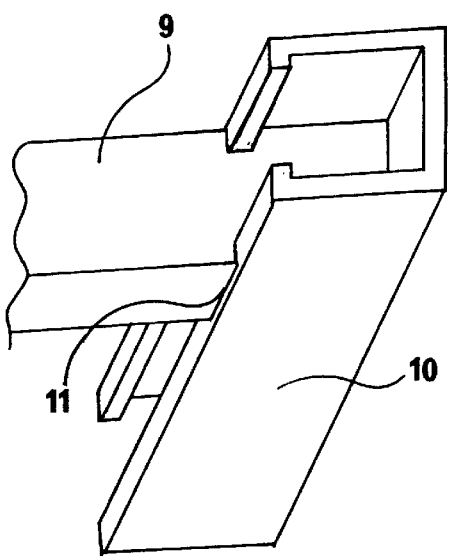
FIGS. 2 and 3 show assembly examples of the invention of two elements of a lattice girder.

FIG. 2 shows an example of an assembling mode according to the invention of a beam 9 and a vertical stanchion 10. As can be seen, the stanchion 10, partially open, has a notch 11 in which the unnotched extremity of the beam 9 is engaged.

Figure 3:
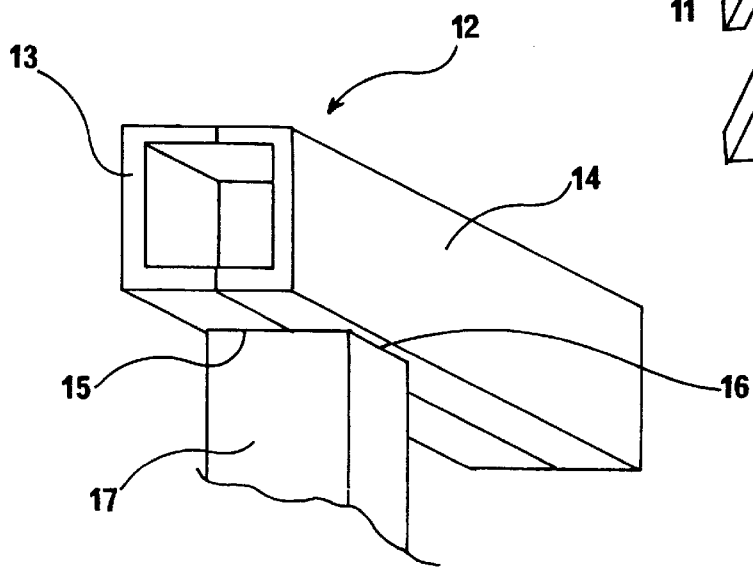

FIG. 3 shows a more preferred embodiment of the assembly of the invention, the beam 12 being embodied from two half-profiles 13, 14 comprising assembly windows 15, 16, these half-profiles being brought together with one against the other longitudinally following insertion in said windows of the corresponding extremity of the stanchion 17.

FIGS. 4 and 5 show an improvement made to the mounting conditions via the bringing together of two half-profiles. The two half-profiles 18, 19 for constituting a beam are internally fitted with longitudinal tongues with transverse notches 20, 21 which by means of pressure are able to apply the half-profiles against each other and definitively render them integral so as to form a single profile. FIG. 4 shows the half-profiles 18, 19 spaced from each other so as to allow the introduction in their opposing windows 22, 23 of the extremity of an oblique crossbeam 24 notched at 25 and 26. FIG. 5 shows the embedding embodied after locking of the beam via the cooperation of the tongues 20, 21.

FIGS. 6 to 8 show a girder according to the invention and able to be used as a guard-rail for a suspended walkway and designed to this effect so as to be joined to a floor of this walkway and a suspension strap. The beams 27 of the girder have at each extremity an extension 28 which comprises two lateral notches 29 (see FIG. 7). Slid vertically into the notches 29 of the corresponding extremities of the upper and lower beams 27 is a tubular stanchion 30 comprising one side, partially or completely open, which, as shown on FIG. 8, is fixed by screwing to a walkway floor structure 31 shown by the dotted line.

As can be seen on FIGS. 4 and 5, each of the half profiles 18, 19 for constituting a beam externally has opposing portions 32 forming slides which make it possible via sliding between these two portions to embody a plate (not shown on the drawing) bearing inscriptions or used as a support for the accessories.

The above description has been given merely by way of non-restrictive example and constructive additions or modifications could be made without departing from the context of the present invention.

What is claimed is:

1. Lattice girder for supporting loads or stresses, which comprises:
   (a) an assembly of first and second hollow profiled elements, said first hollow profiled elements having projecting portions and said second hollow profiled elements having portions forming receiving housings, said projecting portions of said first profiled elements being rigidly embedded into said portions forming receiving housings of said second hollow profiled elements,
   (b) said second profiled elements comprising said receiving housings having two half elements longitudinally assembled, each one of said two half-elements comprising a part of said receiving housing, assembly of said half-elements around said first hollow profiled element ensuring embedding of this first hollow profiled element into said receiving housing; and
   (c) said projecting portions and said receiving housing provided by cuts allowing said embedding to resist, without a use of other connecting means, leading or stresses by self-locking of said projecting portions with said receiving housings after assembling of said half-elements.

2. Lattice girder according to claim 1 wherein linking members render integral said two half elements of each second profiled element, said linking members consisting of a hooking structure integrated with each said half element, the two hooking structures of said second profiled element being opposite each other and corresponding to each other so as to render said two half elements integral via one being pressed against the other.

3. Lattice girder according to claim 1 wherein said profiled elements have opposing portions forming a slide which make it possible via sliding to embed a plate bearing inscriptions or to be used as an accessory support.

4. Lattice girder assembly comprising a lattice girder according to claim 1 wherein said lattice girder is configured so as to form a suspended walkway guard rail connected to a floor and a suspension strap.

5. Lattice girder assembly according to claim 4 wherein horizontal hollow profiled elements of the girder receive at each extremity a notched extension receiving via vertical engagement at least one partially open stanchion whose lower portion is fixed to a floor structural element so as to embody a walkway or walkway module.

* * * * *